United States Patent Office 2,873,183
Patented Feb. 10, 1959

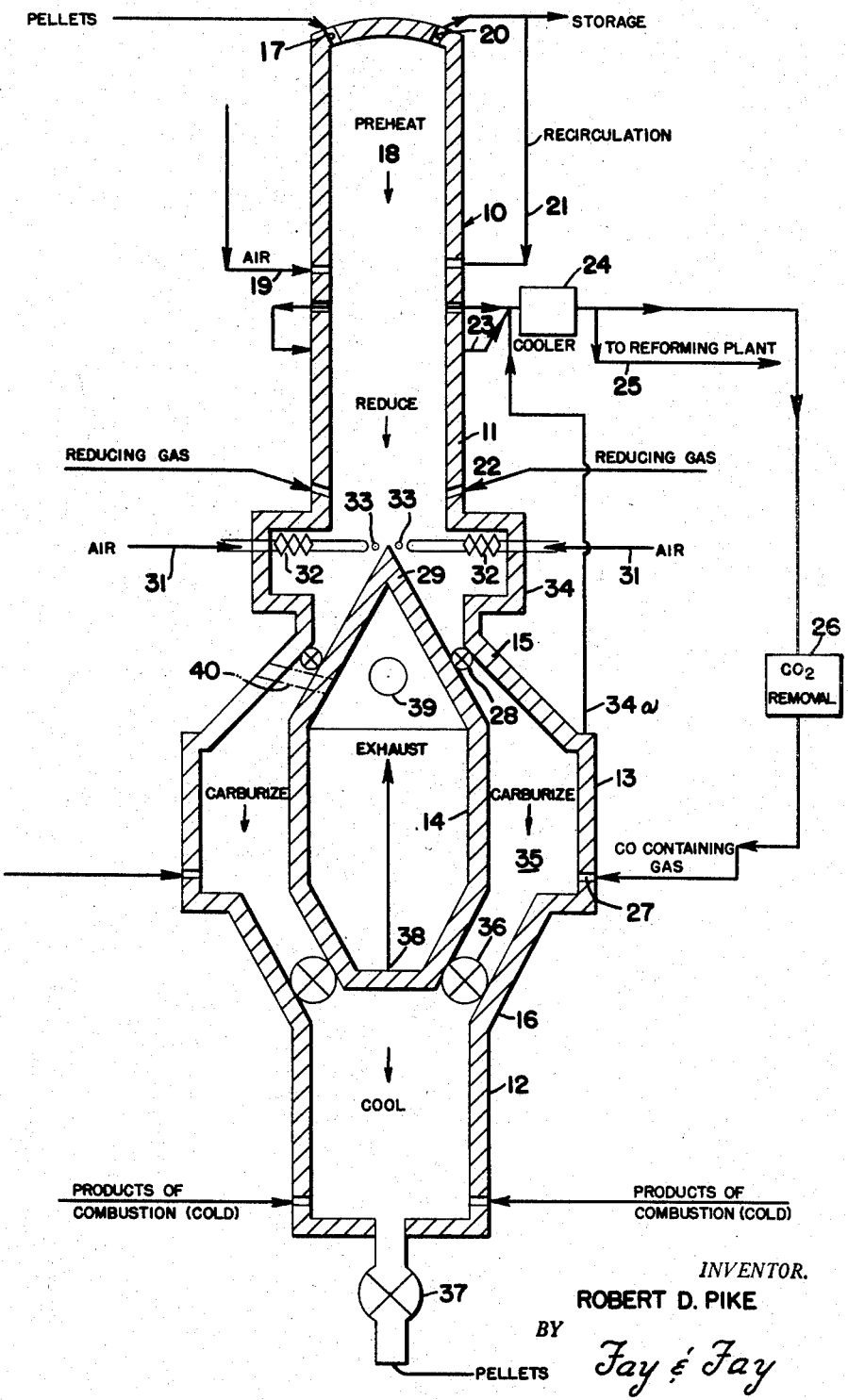

2,873,183

CONTINUOUS IRON ORE REDUCTION PROCESS

Robert D. Pike, Greenwich, Conn.; Kenneth B. Ray and The Stamford Trust Company, executors of said Robert D. Pike, deceased Application July 7, 1954, Serial No. 441,724

9 Claims. (Cl. 75—35)

This invention, relating as indicated to a continuous iron ore reduction process, is particularly directed to a direct reduction process to convert an iron oxide containing ore to its reduced form containing principally iron and a small percentage of iron oxide and depositing in said ore, carbon for subsequent reduction of the oxides of iron in a steelmaking furnace and possibly to heat the charge in the furnace and reduce the electrical requirement of the electric furnace and the cost thereof by the use of oxygen to consume the carbon and heat the charge.

This invention further relates to a process and apparatus for continuously performing a direct reduction process and producing a completed product which may serve as a suitable feed in a steelmaking furnace.

Up until the present time, centuries of technology have gone into producing pig iron from a variety of iron ores and subsequently using this in a Bessemer converter furnace or in an open hearth furnace. Essentially this two-step process has had a great number of efforts to improve it in the form of direct processes rather than this indirect two-step process, but these generally have resulted in various forms of materials, such as sponge iron and the like, which have achieved some limited success but not an outstanding success. This process and apparatus is directed to a continuous iron ore reduction process suitable for use in a steelmaking furnace, either of the electric arc, the open hearth, or perhaps other types of furnaces. The invention further uses some of the reduction steps of my prior patent, No. 2,501,189, entitled "Production of Metallic Iron From Iron Oxides," dated March 21, 1950, as well as using some or all of the steps of my process identified in Patent No. 2,653,088, dated September 22, 1953, and entitled "Direct Production of Steel From Oxides of Iron."

This invention further has the advantages of being a continuous process requiring the employment of certain combustion gases, reducing gases, as well as cooling gases, which can be continuously recycled and reformed to provide the necessary components of this process. However, by the very nature of the continuous operation disclosed herein, facilities for storing the gases are reduced and the operation can be greatly simplified.

An object of this invention is to produce a continuous steelmaking process, a continuous iron ore reduction process, and an apparatus for operating said process.

A further object of this invention is to simplify the various batch processes, the reduction processes for reducing ores, and making steel from the reduced product by operating said process in a continuous manner to eliminate the necessary storage of gaseous components for said process.

A further object of this invention is to provide a simplified direct and continuous iron ore reduction process in a single shaft furnace and to adapt a process for reducing said ores and making the reduction product usable in a steelmaking furnace directly.

A further object of this invention is to reduce beneficiated iron ores or high purity iron ores that are low in silica in areas where the fuel source is gaseous, and adapt said gaseous fuel to a continuous iron ore reduction process in which the product may be subsequently readily used in a steelmaking furnace, either of the electric arc or the open hearth type, and, in fact, almost any steelmaking furnace.

A further object of the invention is to provide a continuous steelmaking process and furnace that may take a source of high purity iron as a feed in a furnace which is adaptable for use on gaseous fuels at remote points, perhaps at the location of the iron ore itself, in which said partially reduced iron ore may be stored and used during periods of emergency to supplement scrap iron and its use in steelmaking furnaces.

A further object of the invention is to provide a process for making a scrap iron substitute during periods of national emergency whereby said products either can be stockpiled or the furnaces quickly built to supplement the steelmaking capacity of a country as it works to its maximum output during said periods of emergency and exhausts or substantially reduces the scrap iron available or that can be made readily available, and by this chain of events keep up the steelmaking capacity of a country which may be severely limited by the amount of scrap that is available.

A further object of the invention is to produce a direct continuous iron ore reduction process, usable in countries and small locations that have iron ore or may have iron ore shipped there, where a source of gaseous fuel containing carbon is available and to produce a process of making a steelmaking furnace feed in which there is greater adaptability and range of sizes in the furnace capacity by this process so that small and large units may be made to fit the needs of the location.

To the accomplishment of the foregoing and related ends, said invention, then, consists of the means, including both the apparatus and the process hereinafter fully described and particularly pointed out in the claims, the following description setting forth in detail one approved method of carrying out this continuous iron ore reduction process, such described method, however, constituting but one of the various ways in which the principles set forth herein may be used.

In the drawing the figure is a schematic diagram of the furnace and the various feeds to the furnace in terms of ores and gases for accomplishing the reduction, carburization, and cooling of the ore.

This invention, relating as indicated to a continuous iron ore reduction process, is basically a shaft type of furnace having some unusual components to accomplish the objective of continuously treating an ore, perhaps low in silica and having a relatively high content of iron oxide, possibly a magnetite ore or a beneficiated taconite, and treating said ore by the several steps of preheating, reducing exothermically, cooling and carburizing with a CO containing gas, as is described in my previous Patent No. 2,653,088, and subsequently cooling said carburized ore with inert products of combustion so that the ore will not be oxidized on exposure to the air.

This process then basically consists of a central shaft shown at 10, having an upper portion 11 and a lower portion 12. Between said upper and lower portions is a central portion 13 and a central pilot 14. Suitable connection or valving means between said central pilot and the shaft itself provides that the central portion 13 is an annular chamber connected by said valving means 15 and 16 so that the shaft furnace is divided into essentially three portions, the upper portion designated 11 for the preheating and reduction steps, a central portion for carburization 13, and a lower portion for cooling 12.

This arrangement of parts in a shaft furnace is particularly adapted to reducing the load of pellets of iron oxide so that the weight of the charge on any particular section is reduced, and further to provide means for controlling the gases to the various stages in the reduction process without actually having physical means for moving the charge in some manner. Basically, the apparatus consists of the aforementioned shaft furnace 10, having suitable openings at 17 for introduction of the pellets, either continuously or periodically. In the upper portion 11 of the furnace at 18 the preheating step is carried on by introduction of fuel gas and air, as shown at 19. This fuel gas and air may have sufficient air for combustion of the fuel but may not be particularly oxidizing under the circumstances. Some of the combustion products are taken off, as is shown at 20, and put in storage or connected by suitable means to the lower chamber 12, i. e., they may be connected directly after suitable cooling means are used or they may be stored and subsequently reused. Some recirculation of said products of combustion is shown at 21. As the ore passes through the shaft 10, it is reduced in the next section of the shaft. Reducing gas is forced into the furnace at 22 and passes upwardly while the ore passes counter current thereto and said gas is removed at 23, and then cooled, as shown by the cooler 24, and part of it is sent to the reforming plant indicated at 25 and part of it is treated to remove the $CO_2$, i. e., carbon dioxide, as is shown at 26 and leaving the carbon monoxide, i. e., CO in the gas and said gas is subsequently used in the carburizing step and introduced into chamber 13 at 27.

In the reduction step previously mentioned, the ratio of the endothermic and exothermic gases is such that the net action is exothermic, thus producing no net cooling of the ore in this step. The ore, having been previously preheated in the preheating step to temperatures suitable for reduction, is not cooled by the endothermic gases of reduction since they are balanced or exceeded by the exothermic gases, as is taught in my prior patents.

In this patent I am teaching a method and an apparatus for combining these process steps so that the operations can be continuously performed. In the event that there is some mixing of the introduction of fuel gas and air into the furnace, it is not believed that this intermixing will be harmful as the fuel gas for the preheating step contains only sufficient oxygen to burn the fuel gas and such reducing gas, including CO and hydrogen and possibly others, as is mixed in with the fuel gas. Suitable apparatus, possibly including suction apparatus, will remove the reducing gas at 23.

It may be seen, of course, that, depending upon the particular conditions and the ore, it will be possible in this process to reduce for a portion of the cycle and preheat for another portion of the cycle so that the preheating and reduction portion of the cycle would not have to extend over the same period of time. At this phase in the continuous treatment of the ore, the ore passes down into a connecting means 15, which might be called a valving means, the specific mechanism being shown at 28, around a central pilot 14, the point of which is shown at 29. This permits the ore, which may be subjected to incipient sticking, to break up and a "Sylphon" poker is employed to break up the ore. This is actuated by air, as is shown at 31, operating a bellows 32. A multiplicity of these pokers are shown around the periphery of the furnace and project inwardly. Points of the other pokers are shown at 33. The housing mechanism for said poker is shown at 34. Around the pilot 14 and its pointed nose 29 are a series of valving mechanisms previously mentioned, which form a throat over which the reduced ore passes into the annular chamber for carburizing. In this chamber 13 CO containing gas is admitted at 27. Said gas deposits carbon in the ore, as is taught in my prior patent, for subsequent reduction of the ore in the steelmaking furnace and to reduce the amount of electric heating in a particular type of furnace, the electric arc furnace, wherein oxygen would be used, combining with the carbon for supplementary heating. Said gas is removed at 34a and is recycled to the cooler and reforming plant at 24 and 25 respectively.

This arrangement of an annular chamber surounding a pilot has a number of advantages and these are that it provides a suitable valving mechanism between the stages in a continuous process and at the same time reduces the head of ore on any section of the process and permits an easy and convenient way to separate the streams of different kinds of gas, combustion gases, reducing gases, carburizing gases, and cooling gases for the various steps of the furnace. Said carburizing portion of the furnace is shown at 35 and the ore is removed from said annular chamber by valving means 36 to the lower portion of the central shaft 12.

In this earlier portion of the furnace the cold products of combustion were removed from the preheating stage 18 and carried to storage as is shown at 20, and they are now recycled. These products of combustion contain little or no free oxygen and can cool the carburized and reduced iron ore to a point at which it may be exposed to the air without further oxidation.

Following this step the pellets of iron ore are now reduced to substantially pure iron and are discharged by valving means shown at 37 into suitable conveying or storing means for subsequent use in a steelmaking furnace. In this latter step of cooling the products of combustion pass through the furnace and go into the central pilot as shown at 38 and are exhausted as is shown at 39 out through the pilot and connector 40.

This combination of steps and the apparatus therefor can be seen to be particularly effective to continuously process, preheat, reduce, carburize, and cool iron ore in order to provide a feed for a steelmaking furnace. Because of the high purity of this material, it can be used advantageously in the steelmaking furnaces as a substitute for scrap iron. In addition, in certain types of electric furnaces, it may be desirable to add carbon in the carburizing step in order to provide material for the oxygen to burn with so that electric arc furnaces may be in the nature of a converter, and reduce the consumption of electrical heat by this means. The addition of carbon to the reduced iron ore by this method and apparatus reduces the remaining 10% of the iron oxide to a metallic iron in the electric furnace and is an easy way to add carbon to the product, employing the furnace as a converter.

In operation, then, this is an apparatus and a process of continuously reducing iron oxide without fusion and carburizing the same. In the upper portion of the furnace the ore is heated to a temperature which makes it suitable for reduction, about 1650–2000° F. Beneath this a hot reducing gas, which is exothermic, passes therethrough. The exothermic components of the reducing gas are CO and the endothermics would normally be hydrogen, plus other gases. These pass through the ore at 1650–2000° F. to reduce substantially 90% or more of the oxide to metallic iron by gaseous reduction. Beneath this the "Sylphon" pokers vibrate in the ore to prevent incipient fusion, and then the ore passes to an annular chamber where it is carburized by the action $2CO = CO_2 + C$, and in the ore at this stage sufficient carbon is deposited to reduce the unreduced oxide and additional carbon may be implanted therein to save on the expenses of fuel in the steelmaking furnace. In the lower portion of the vertical furnace cold gas of combustion from the preheat stage is used to reduce the ore to a temperature wherein it will not re-oxidize in the air. Basically, of course, many of the steps of this process are countercurrent in their operation, the gases passing in one direction through the ore and the ore passing in the opposite direction.

Although the present invention of a continuous iron ore reduction process has been described in connection with preferred apparatus, variations and modifications may be resorted to by those skilled in the technology of iron and steel without departing from the principle of the invention. All of these variations and modifications are considered to be within the true spirit and scope of the present invention as disclosed in the foregoing description and defined by the appended claims to a method and an apparatus.

I claim:

1. A process of continuously reducing iron oxide ore without fusion and carburizing the same along a path of flow through a furnace, which consists of heating the ore to a temperature suitable for reduction in a first zone, separately passing a hot exothermic reducing gas substantially free of hydrocarbon containing endothermic and exothermic components, the latter being CO, through the heated oxide at a temperature between 1650–2000° F. in a second zone to reduce the greater part of it to metallic iron by gaseous reduction, vibrating the reduced ore to prevent incipient fusion, separately passing another relatively cool reducing gas containing CO through the reduced oxide in a third zone, thereby cooling the oxide and carburizing it by the reaction of the $2CO=CO_2+C$ so that at least sufficient carbon is deposited to reduce the unreduced oxide and then completing the cooling under non-oxidizing conditions in a fourth zone.

2. The process of continuously reducing iron oxide and carburizing the same without fusion of the oxide along the path of flow through a furnace, which consists of heating the oxide in a first zone to a temperature suitable for rapid gaseous reduction without fusion, separately passing reducing gas substantially free from hydrocarbons at a temperature between 1650–2000° F. through the heated iron oxide in a second zone to reduce a major portion of it to metallic iron, said reducing gas containing exothermic and endothermic components, including CO as a part of the exothermic gas and $H_2$ as part of the endothermic gas, while maintaining the ratio of the CO and the $H_2$ in the gas so that the exothermic heat of reduction by CO will exceed that of the endothermic heat of reduction by $H_2$, separately passing a relatively cool reducing gas containing CO but being relatively free of $CO_2$ at the point of introduction through the reduced oxide in a third zone thereby cooling the reduced oxide and carburizing it by the reaction $2CO=CO_2+C$ with at least sufficient carbon to reduce the unreduced oxide, and further cooling the reduced carburized iron oxide with cool combustion gas substantially free of oxygen to a temperature at which the reduced oxide will not re-oxidize in the air.

3. A process of reducing oxidic iron ore continuously without fusion and carburizing the same along a path of flow through a furnace, which consists of heating the oxide to a temperature suitable for rapid gaseous reduction without fusion in a first zone, separately passing reducing gas substantially free from hydrocarbons at a temperature between 1650–2000° F. through the heated iron ore in a second zone to reduce a major portion of it to metallic iron, said reducing gas containing exothermic and endothermic components, including CO as a part of the exothermic gas and $H_2$ as a part of the endothermic gas, while maintaining the ratio of the CO and the $H_2$ in the gas so that the exothermic heat of reduction by CO will exceed that of the endothermic heat of reduction by $H_2$, agitating said reduced oxide to prevent incipient fusion, separately passing a relatively cool reducing gas containing CO but being relatively free of $CO_2$ at the point of introduction through the reduced oxide in a third zone thereby cooling the reduced oxide and carburizing it by the reaction $2CO=CO_2+C$ with at least sufficient carbon to reduce the unreduced oxide, and further cooling the reduced carburized iron oxide with cool combustion gas substantially free of oxygen to a temperature at which the reduced oxide will not re-oxidize in the air.

4. The method of continuously reducing iron oxide ore without fusion and carburizing same along a path of flow through a furnace, which consists of passing the iron ore through a first zone in counter-current operation with hot combustion gas to preheat the same to a temperature suitable for reducing the ore, passing the hot iron ore through a second zone in counter-current operation to separately introduced hot CO-containing exothermic reducing gas substantially free of hydrocarbon at a reducing temperature to reduce the major portion of the ore to iron and removing the spent reducing gas from the furnace before the point of introduction of the hot combustion gas, agitating said reduced iron oxide to prevent incipient fusion, removing said reduced iron oxide to a subsequent chamber constituting a third zone, separately passing CO-containing gas through the iron oxide in said chamber at a lower temperature to deposit carbon sufficient to reduce any unreduced iron oxide, according to the reaction $2CO=CO_2-C$ and removing spent CO-containing gas before the point of introduction of said reducing gas, and passing said carburized oxide to a cooling chamber constituting a fourth zone and cooling the carburized iron oxide therein with cold products of combustion to a temperature so that the reduced oxide may be subjected to air without reoxidation.

5. In a continuous iron ore reduction process in a shaft type furnace having an intermediate pilot and supporting means therefor, and an annular chamber surrounding said pilot, said pilot and shaft having appropriate connections at the entrance and exit from said annular chamber, the steps which consist of preheating the ore to a reducing temperature in an upper portion thereof constituting a first zone, passing the ore to a portion of the shaft furnace constituting a second zone immediately below said first zone but above said chamber, separately passing a CO-containing exothermic reducing gas mixture substantially free of hydrocarbon into and out of said furnace and through the iron oxide in said second zone at a temperature between 1650–2000° F. to reduce the major portion of the iron oxide to iron, passing the ore through the connecting means to said annular chamber constituting a third zone, separately passing a relatively cooler CO-containing gas through a reducing iron oxide in said third zone to deposit carbon therein sufficient to reduce any unreduced iron oxide, further passing said ore through valving means to a cooling chamber constituting a fourth zone and passing cold products of combustion from said first step through the iron oxide in said fourth zone.

6. An apparatus for continuously reducing iron ore comprising a vertical shaft having a central pilot intermediate the ends thereof, said central pilot dividing the shaft and forming an annular chamber surrounding said pilot, valving means between said pilot and the shaft, separate means for separately passing gases into and out of said furnace and through a zone near the top of said furnace to preheat the iron ore, separate means for separately passing gases into and out of said furnace and through a second zone between said first zone and said chamber to reduce the iron oxide, separate means for passing gases into and out of said furnace and through said chamber constituting a third zone to carburize the iron oxide and separate means to pass gases into and out of said furnace and through a fourth zone below said annular chamber to cool the carburized iron oxide.

7. The apparatus of claim 6, in which there is a means for breaking the ore to prevent incipient sticking immediately above the central pilot.

8. The apparatus of claim 6, in which the central pilot serves as exhaust means for the gases passing out of the lower portion of the shaft below the pilot.

9. A continuous process for reducing and carburizing a flowing mass of iron oxide along its path of flow through a furnace, comprising heating the ore to a temperature suitable for reduction in a first zone, separately passing a hot exothermic reducing gas substantially free of hydrocarbon containing endothermic and exothermic components, the latter being CO, through a heated ore in a second zone at a temperature between 1650–2000° F. to reduce the greater part of it to metallic iron by gaseous reduction, and then separately passing another cooler reducing gas containing CO through the reduced ore in a third zone and out of the furnace so that at least sufficient carbon to reduce the unreduced oxide is deposited on the ore by the reaction to $2CO = CO_2 + C$.

References Cited in the file of this patent

UNITED STATES PATENTS

| | | |
|---|---|---|
| 100,095 | Adams | Feb. 22, 1870 |
| 799,001 | Grondal | Sept. 5, 1905 |
| 982,243 | Case | Jan. 24, 1911 |
| 1,058,034 | Christensen | Apr. 8, 1913 |
| 1,319,589 | Jones | Oct. 21, 1919 |
| 1,690,916 | Westburg | Nov. 6, 1928 |
| 2,282,124 | Fahrenwald | Mar. 8, 1941 |
| 2,296,522 | Hartley | Sept. 22, 1942 |
| 2,470,106 | Parry | May 17, 1949 |
| 2,481,217 | Hemminger | Sept. 6, 1949 |
| 2,739,055 | Gallusser | Mar. 20, 1956 |